US009021534B2

(12) United States Patent
Watson et al.

(10) Patent No.: US 9,021,534 B2
(45) Date of Patent: Apr. 28, 2015

(54) GUIDED TELEVISION METHOD AND SYSTEM

(75) Inventors: David Watson, Valencia, CA (US); Stephan Fopeano, Los Angeles, CA (US); Stacy Parr, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 773 days.

(21) Appl. No.: 12/217,688

(22) Filed: Jul. 8, 2008

(65) Prior Publication Data

US 2009/0077598 A1 Mar. 19, 2009

Related U.S. Application Data

(60) Provisional application No. 60/994,366, filed on Sep. 18, 2007.

(51) Int. Cl.
| H04N 7/173 | (2011.01) |
| G06F 3/00 | (2006.01) |
| H04N 21/2225 | (2011.01) |
| H04N 21/258 | (2011.01) |
| H04N 21/466 | (2011.01) |
| H04N 21/472 | (2011.01) |
| H04N 21/482 | (2011.01) |
| H04N 21/81 | (2011.01) |

(52) U.S. Cl.
CPC ....... *H04N 7/17318* (2013.01); *H04N 7/17336* (2013.01); *H04N 21/2225* (2013.01); *H04N 21/25866* (2013.01); *H04N 21/25891* (2013.01); *H04N 21/4667* (2013.01); *H04N 21/47202* (2013.01); *H04N 21/4826* (2013.01); *H04N 21/812* (2013.01)

(58) Field of Classification Search
CPC ............. H04N 21/25866; H04N 21/4667; H04N 21/47202; H04N 7/17336; H04N 21/25891
See application file for complete search history.

(56) References Cited

U.S. PATENT DOCUMENTS

| 7,370,342 B2 * | 5/2008 | Ismail et al. ..................... 725/46 |
| 2003/0126600 A1 * | 7/2003 | Heuvelman ..................... 725/35 |
| 2004/0003396 A1 * | 1/2004 | Babu ............................... 725/34 |
| 2004/0030599 A1 | 2/2004 | Sie et al. |
| 2004/0221308 A1 * | 11/2004 | Cuttner et al. ................... 725/46 |
| 2006/0031882 A1 * | 2/2006 | Swix et al. ....................... 725/46 |
| 2007/0157237 A1 * | 7/2007 | Cordray et al. .................. 725/42 |
| 2008/0115161 A1 * | 5/2008 | Kurzion ........................... 725/32 |

FOREIGN PATENT DOCUMENTS

| WO | WO 2004/006574 | 1/2004 |
| WO | WO 2005/107256 | 11/2005 |

* cited by examiner

*Primary Examiner* — Rong Le
(74) *Attorney, Agent, or Firm* — Farjami & Farjami LLP

(57) ABSTRACT

There is provided a method for guiding viewer selection of television content. The method comprises receiving a request for delivery of television content from a remote system; establishing an identity of the remote system; accessing a viewing history corresponding to the remote system in response to receiving the request; identifying a desirable subset of content items from available television content based upon a first plurality of discrimination criteria including the viewing history; determining a display subset of content items from the desirable subset, to be provided for selection by the remote system, according to a second plurality of discrimination criteria including the viewing history; and delivering an interface to the remote system for enabling a viewer of the remote system to select content items from the display subset.

13 Claims, 11 Drawing Sheets

TRADITIONAL TV: LINEAR ADS

VOD: SKIPPED ADS

GUIDED TELEVISION METHOD AND SYSTEM

RELATED APPLICATIONS

This application claims priority from U.S. Provisional Application No. 60/994,366, filed on Sep. 18, 2007, which is hereby incorporated by reference in its entirety.

BACKGROUND OF THE INVENTION

1. Field of the Invention

The present invention relates generally to the distribution of media content. More particularly, the present invention relates to network mediated delivery of television content.

2. Background Art

Historically, the availability of television (TV) content has been dictated by the networks providing TV programming, limiting viewer choice to selection among the offerings of relatively few competing broadcast networks during a given time slot. The linear TV broadcasting model many TV viewers have grown accustomed to involves those viewers watching what is offered as "on air" or linear TV programming, according to a predetermined broadcast schedule. TV viewers typically learn about and find programs to watch through a program listing, which can be, for example, a paper listing or an electronic listing on the TV, such as an Electronic Program Guide (EPG). While this conventional approach to identifying desirable programming may have been helpful to viewers when the programming choices were relatively limited, it has grown progressively more inefficient as programming networks and network content has proliferated.

FIG. 1A is a diagram representing a traditional linear TV viewing experience. In the traditional TV viewing experience, a network assumes responsibility for entertaining a viewer by presenting a slate of shows. If the viewer does not like the shows that are presented by the network, the viewer can switch to a competing network. As may be seen from FIG. 1A, the dominant paradigm for consumption in the traditional viewing experience is that content, selected by the networks, is pushed to viewers, whose selection options are limited to accepting or rejecting the pushed content.

More recently, the emergence of video-on-demand (VOD) viewing capability through videocassette recorders (VCRs), digital video recorders (DVRs), broadband and cable video on-demand have substantially increased the number of consumer options available to viewers. What is more, those innovations have shifted the dominant paradigm for television content consumption. In the face of this evolving and expanding universe of available television content to choose from, the traditional consumer selection interfaces, e.g., paper program listings and electronic program listings on TV, are no longer effective. Furthermore, the on-demand selection interfaces provided to inform viewers about VOD content options are largely based on Internet metaphors, and rely mainly on cascading menus and hierarchical categorization of content. Because that Internet format may not be familiar to traditional television viewers, nor in harmony with the typical television usage of most of viewers, it has not succeeded in providing an effective consumer interface for VOD content.

FIG. 1B is a diagram representing a conventional VOD viewing experience. In the traditional VOD viewing experience, many shows are made available for a viewer to choose from, allowing the viewer to decide what to watch and when to watch it. As may be seen from comparison of FIGS. 1A and 1B, the transition from a traditional television viewing experience to a traditional VOD viewing experience introduces a consumption paradigm that shifts the burden of selection almost entirely to the viewer. Thus, whereas in the past, and even today on linear television, content is pushed to the viewer, under the VOD consumption paradigm it is incumbent on the viewer to identify and pull desired content from the networks. As the inventory of available shows increases, however, the viewer can be required to exert more effort to determine what to watch and where to find it, transforming what is intended to be a recreational and entertaining experience into and increasingly frustrating and burdensome one.

The enhanced control over content consumption exercised by viewers according to the VOD consumption paradigm also has consequences for advertisers seeking to target a viewing audience. FIG. 2A shows a diagram representing a traditional linear TV advertising experience. In the traditional linear TV advertising experience, advertisers typically broadcast an ad multiple times during a program, in order to imprint awareness of their product or service on viewers who may be largely indifferent to the advertising content. This approach is of limited effectiveness with a truly uninterested viewer, and can result in audience frustration even for viewers predisposed to be receptive to the advertising content. Consequently, the traditional linear TV advertising experience is often unappreciated by the viewer and may result in significant unrequited expenditure by the advertiser.

FIG. 2B shows a diagram representing a typical advertising experience for a user of a DVR. Stated more bluntly, FIG. 2B shows ad skipping by a DVR user. In reality, a fairly large percentage of ads are skipped by DVR users, for example, through fast forwarding past the ads. Clearly, allowing viewers to simply skip ads creates an unattractive advertising environment for those expending funds to deliver the advertising content. Moreover, although in some VOD implementation users can be prevented from engaging in ad skipping, that simply results in reversion to the traditional linear advertising experience, which, as previously described may be undesirable for several reasons. Thus, blocking a user's ability to fast forward through ads fails to address the problems of viewer frustration and unrequited investment by advertisers.

Accordingly, there is a need to overcome the drawbacks and deficiencies in the art by providing a solution enabling a viewer to readily identify and locate television content of interest. The solution should further provide a means for advertisers to effectively deliver advertising content to the viewer in a manner that engages the viewer as a participant in an interactive process.

SUMMARY OF THE INVENTION

There are provided guided television methods and systems, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1A:
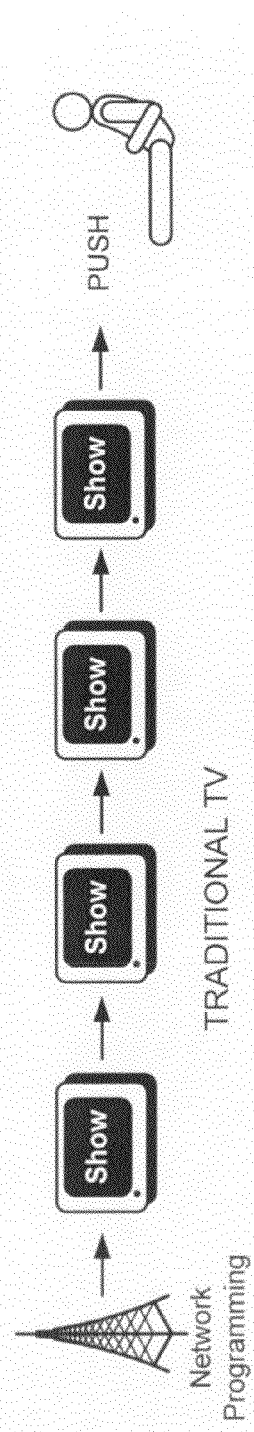
FIG. 1A is a diagram representing a traditional television (TV) viewing experience.

The present application is directed to a guided television method and system. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 3:
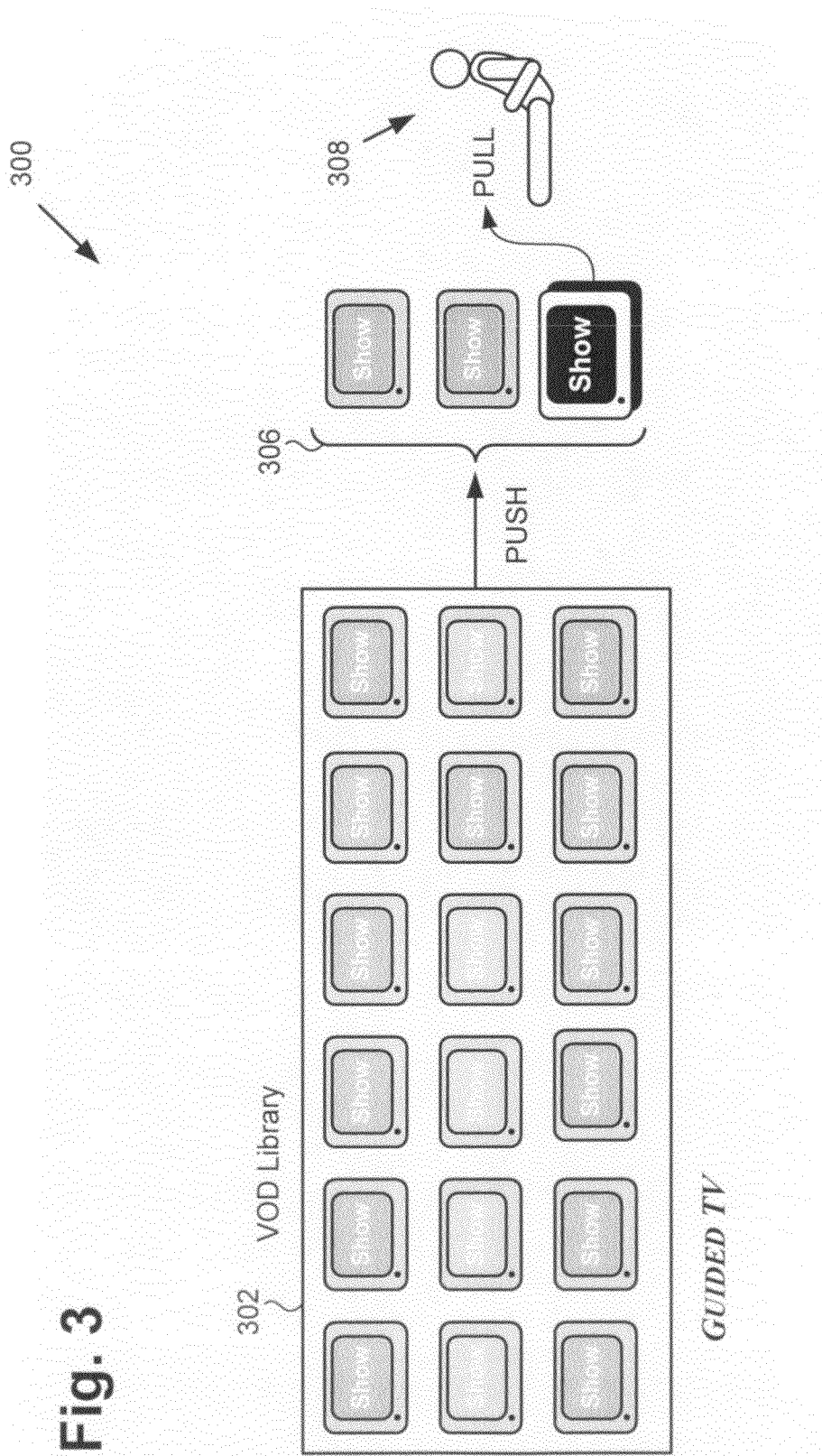
FIG. 3 is a diagram representing a guided TV viewing experience, according to one embodiment of the present invention.

FIG. 3 is a diagram representing a guided television (TV) viewing experience, according to one embodiment of the present invention. Guided TV viewing environment 300 in FIG. 3 includes video-on-demand (VOD) library 302, display subset 306 of TV content items, and viewer 308. In the embodiment of FIG. 3, display subset 306 comprises three items of TV content identified as being desirable to viewer 308 based on a viewing history of viewer 308. The viewing history of viewer 308, which is used by in embodiment of FIG. 3 as part of a plurality of discrimination criteria utilized to identify content as desirable to the viewer, may refer to past consumption of network content by user 308, as will be more fully described later. As shown by FIG. 3, in the guided TV viewing experience provided by an embodiment of the present invention, a network can offer a viewer a choice of a selected number of items of TV content (e.g., "shows") from a wide inventory, where the particular shows that are selected for the viewer are based on information gleaned from the viewer. By limiting the number of choices presented to the viewer, embodiments of the present invention can improve the viewing experience of the viewer by reducing or eliminating "choice anxiety" that can result when the viewer has to select from large content libraries.

The guided TV experience provides an interface, corresponding in FIG. 3 to display subset 306, that gives viewers an easy and effective way to navigate through content options available in an on-demand environment. Moreover, the interface provides the network with a mechanism for guiding viewer 308 through the network's content, represented by VOD library 302. The interface described herein presents a limited number of content choices, such as three content choices, to the viewer at any given time, thereby simplifying the viewer's content selection process.

One component of the interface is a framework or metaphor that allows a network to present a user with a consistent metaphor and functionality while providing a design that is suitable for a channel. It is noted that although the guided TV system is herein described primarily by reference to VOD content, the guided TV system can be utilized for linear channels, on-demand channels, and hybrid channels, as well as for providing ancillary content on other platforms, such as mobile phones, portable media players, and so forth. The guided TV system can also be utilized for advertisements.

Another embodiment of the invention offers a mechanism by which the limited content selections, such as the three (3) content selections in display subset 306, are made for presentation in the interface. For example, the network can offer the viewer a choice of a number of selected shows, such as three (3) network-selected for viewing An important part of this component may be the human expertise of network executives, who have a knowledge and understanding of their audiences' needs and desires and a creative ability to satisfy those needs and desires through the choice and packaging of television programming. Unlike conventional systems that present viewing recommendations, such as Tivo or Firefly, or the algorithms utilized by Google, the present system can advantageously utilize human expertise for intelligently providing the choice and packaging of television programming.

Figure 1B:
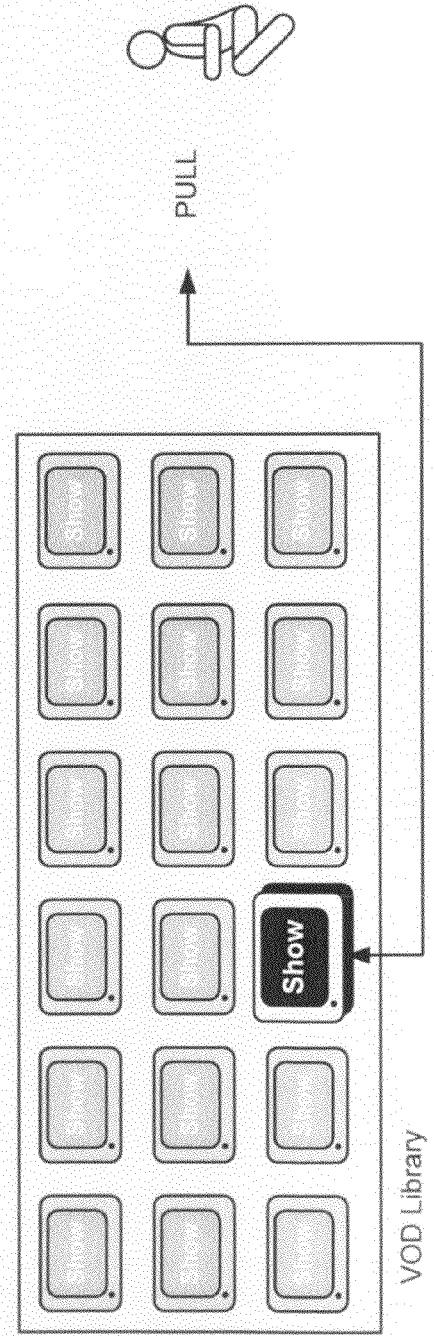
FIG. 1B is a diagram representing a traditional video on-demand (VOD) viewing experience.
Figure 2A:
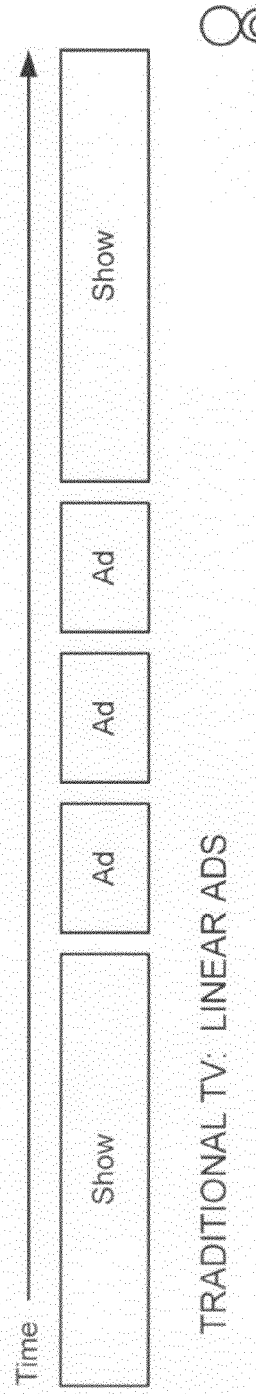
FIG. 2A shows a diagram representing a traditional linear TV advertising experience.
Figure 2B:
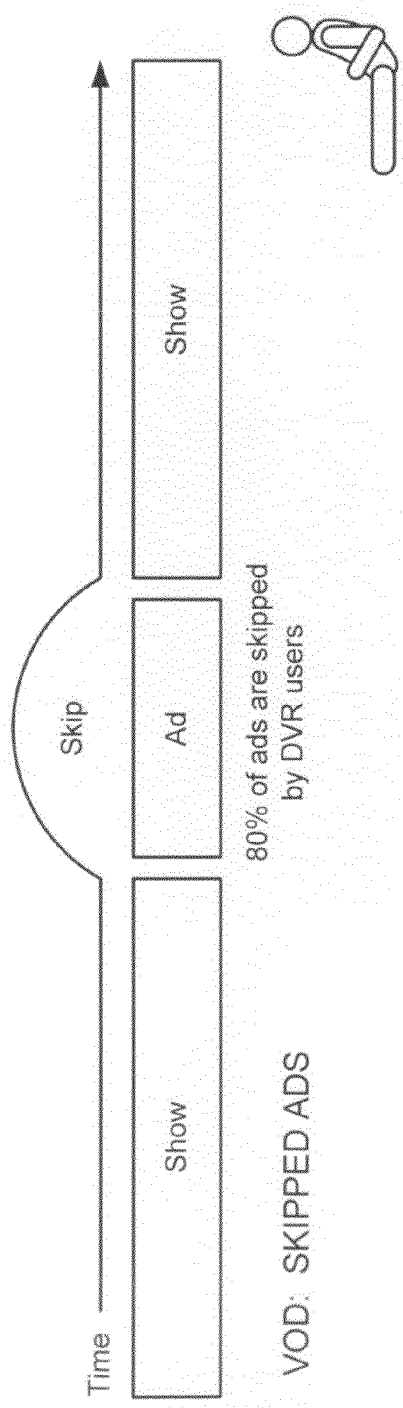
FIG. 2B shows a diagram representing a typical advertising experience for a user of a digital video recorder (DVR)

Comparison of FIG. 3 with FIGS. 1A and 1B, shows that the guided television approach shown by guided television environment 300 offers an alternative consumption paradigm to those of the traditional and conventional approaches. According to the present embodiment, the network is able to anticipate viewer preferences based on viewing history and thus pushes a subset of the content available on VOD library 302 to viewer 308, thereby assuming much of the burden of content selection. However, viewer 308 retains the power to pull content according to his or her present inclinations, and thus may enjoy what can be termed non-linear programming. As a result, the exemplary guided television experience represented by FIG. 3 imbues viewer 308 with the power to select content, while relieving viewer 308 of much of the burden of locating desirable content, thereby providing a richer and less fatiguing viewing experience than is offered by either traditional linear TV or traditional VOD.

Figure 4:
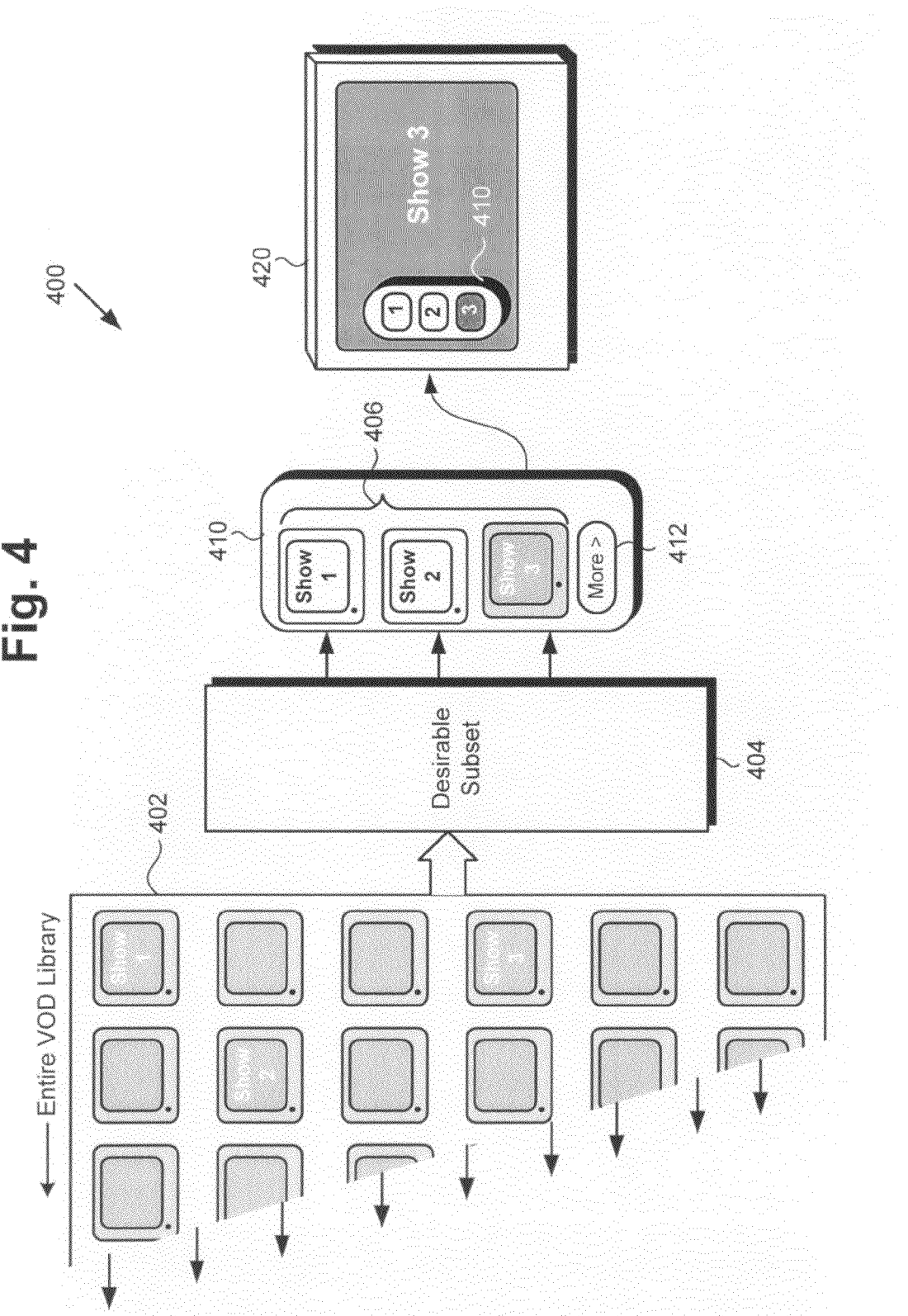
FIG. 4 shows a diagram of non-linear programming provided by a remote system used with a guided TV network, according to one embodiment of the present invention.

FIG. 4 shows a diagram of non-linear programming provided by a guided TV system, according to one embodiment of the present invention. Guided TV viewing environment 400 includes VOD library 402, desirable subset 404 of content items identified as being desirable to a viewer, display subset 406 and "more" button 412 displayed on interface 410, and remote system 420. VOD library 402 and display subset 406 correspond respectively to VOD library 302 and display subset 306, in FIG. 3. As shown in FIG. 4, in one embodiment, interface 410 can display three content choices, corresponding to display subset 406, to a viewer. That display subset may be representative of a desirable subset identified and extracted from entire VOD library 402 by a guided selection application running on a network server, for example, (not shown in FIG. 4), with or without input from a human programming expert, such as a network executive.

Desirable subset 404 may be identified from the content available in VOD library 402 according to a plurality of discrimination criteria, including a viewing history corresponding to remote system 420. The viewing history corresponding to remote system 420 may include, for example, a record of network content consumed through use of remote system 420 by the viewer. In some embodiments, the viewing history may refer to past consumption of network content. In other embodiments, however, the viewing history may be periodically updated to include present viewing patterns as well, so that the viewing history is dynamically changing to reflect present user interaction with network content, for example through guided surfing, which will subsequently be more fully described by reference to FIG. 6.

The plurality of discrimination criteria utilized to identify desirable content may further comprise additional factors related to the viewing history. For example, the consumption history corresponding to remote device 420 represented in a discrimination matrix by the viewing history, may be weighted by the day, time of day, or season associated with the past consumption preferences. In addition, the plurality of discrimination criteria may also include factors independent of the viewing history, such as network programming priorities, or regional consumption preferences. In some embodiments, the discrimination criteria may further include factors introduced through the programming expertise of network executives, who may intervene to customize identification of desirable content.

Certain of the content items contained by desirable subset 404 can be determined as optimal for display to the viewer, resulting in determination of display subset 406, shown on interface 410. Determination of display subset 406 may be based on a second plurality of discrimination criteria including the viewing history. For example, the second plurality of discrimination criteria may include additional weighting criteria resulting in a desirability ranking of the content items comprising the desirable subset. In that way, only the highest ranked, or most desirable content, from desirable subset 404 are included in display subset 406. Moreover, in those embodiments in which the viewing history is not dynamically updated to incorporate present viewing patterns, those present patterns may nevertheless by included in the second plurality of discrimination criteria, so that the rankings determining display subset 406 may be periodically updated to reflect the real time preferences of the viewer.

More button 412 is provided to enable the viewer to scroll through other content items contained in desirable subset 404, but not determined for initial display. As shown in FIG. 4, interface 410 may appear on the left side of a TV screen. However, the interface can also appear at other positions on the TV screen, such as the top or bottom of the TV screen.

Figure 5:
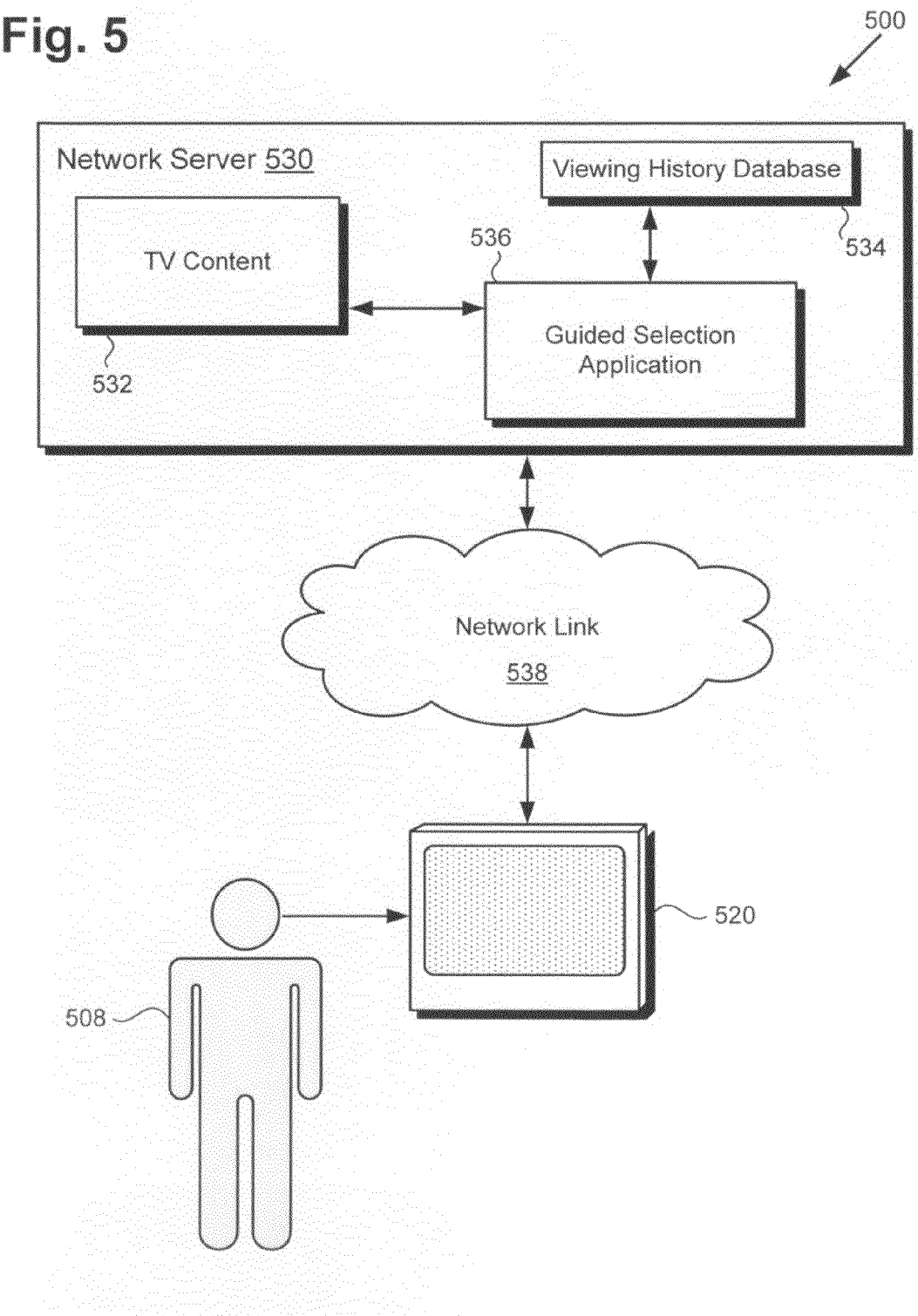
FIG. 5 is a block diagram of a communication network for providing a guided TV experience to a user, according to one embodiment of the present invention.

Turning now to FIG. 5, FIG. 5 shows communication network 500 enabling guided selection of TV content, according to one embodiment of the present invention. In the embodiment of FIG. 5, communication network 500 comprises network server 530 including TV content 532, viewing history database 534, and guided selection application 536. Also included in communication network 500 are network link 538 and remote system 520 utilized by viewer 508. Remote system 520 corresponds to remote system 420 in FIG. 4, while viewer 508 corresponds to viewer 308, in FIG. 3.

According to the embodiment of FIG. 5, viewer 508 may utilize remote system 520 to access TV content 532, which is available from network server 530 over network link 538. TV content 532 represents a plurality of TV content available on network server 530. The plurality of TV content represented by TV content 532 may comprise entertainment content, such as content corresponding to VOD library 402, in FIG. 4, and/or advertising content, for example. It is noted that from the standpoint of network server 530, on which TV content 532 resides, remote system 520 is remotely located.

Guided selection application 536, shown in FIG. 5, may execute as a backend program effectively transparent to viewer 508, for example, but nevertheless intelligently guiding selection of TV content 532 by viewer 508. Guided selection application 536 may be configured to interact with remote system 520, for example, by receiving a request for delivery of TV content from remote system 520, establishing the identity of remote system 520, and identifying a subset of content items from TV content 532 as being desirable based on a viewing history corresponding to remote system 520. Where a received request for TV content is the first request received from remote system 520, so that there is no existing viewing history, a viewing history may be initiated from the first request, and guided content selection may proceed interactively with viewer 508, on the basis of network programming priorities, or according to default selection criteria included in guided selection application 536.

Where a viewing history corresponding to remote device 520 presently exists, for example because the received request for TV content 532 is not the first time remote device 520 has requested TV content 532, the viewing history may be accessed by guided selection application 536. The viewing history may be accessed from viewing history database 534, for example. Guided selection application 536 may then utilize a first plurality of discrimination criteria comprising one or more discrimination criteria in addition to the viewing history to identify a desirable subset of content items. Guided selection application 536 may also be configured to determine a display subset of the content items identified as desirable for display to viewer 508 according to a second plurality of discrimination criteria, and to deliver an interface enabling viewer 508 to select content items from the display subset utilizing remote system 520. The desirable subset, display subset, and interface described in conjunction with FIG. 5 but not shown in that figure, correspond respectively to desirable subset 404, display subset 406, and interface 410, shown in FIG. 4. In such manner, communication network 500, in FIG. 5, can enable viewer 508 to be guided in his or her selection of TV content 532.

In one embodiment, guided selection application 536 may be further configured to pre-select a presentation content item from among the plurality of content comprised by TV content 532 for immediate presentation by remote system 520. Pre-selection of a presentation content might be performed according to a third plurality of discrimination criteria including the viewing history, and may or may not coincide with the first plurality of discrimination criteria utilized in identification of a desirable subset of content items, and/or the second plurality of discrimination criteria utilized to determine the display subset. The pre-selected content item could then be delivered to remote system 520 for automatic presentation to viewer 508. In other words, in this latter embodiment, a request for TV content 532 might result in initializing presentation of a presentation content item by remote system 520, and concurrent display of the interface providing the display subset for selection by viewer 508.

It is noted that for embodiments in which a pre-selected presentation content item is delivered to remote system 520 concurrently with the interface, such as interface 410 in FIG. 4, interface 410 may overlie a portion of the presentation content item by appearing on the left side, right side, bottom, or top of the display screen provided by remote system 420. It is further noted that although remote systems 420 and 520 are represented as TV sets in FIGS. 4 and 5, respectively, in other embodiments remote systems 420 and 520 may comprise a mobile communication devices such as a mobile telephones, digital media players, personal digital assistants (PDAs), wired or wireless computers, or gaming consoles, for example. For those embodiments in which remote systems 420 and 520 do comprise TV sets, those systems may further comprise a cable TV tuner or a satellite set-top box.

Figure 6:
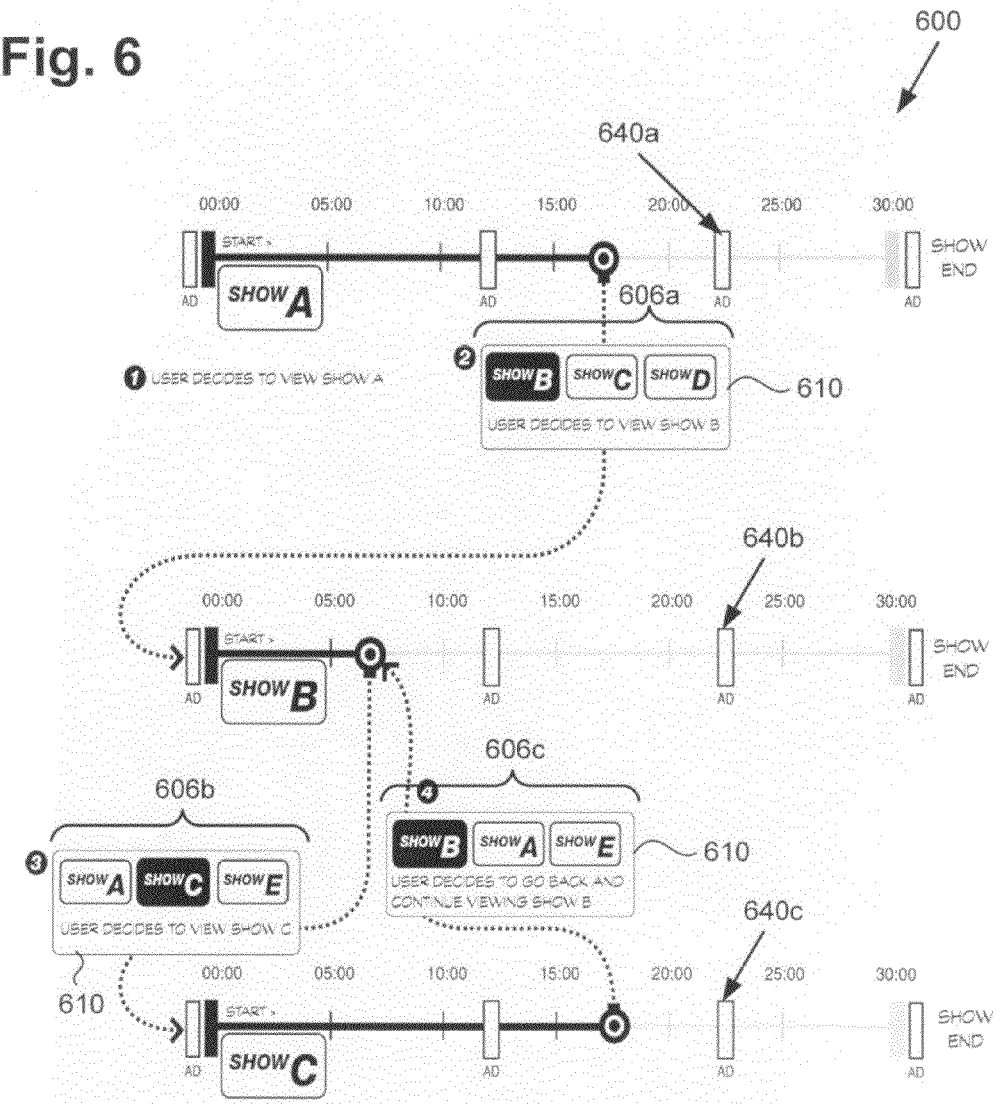
FIG. 6 shows a diagram of guided surfing provided by a guided TV system, according to one embodiment of the present invention.

Moving on to FIG. 6, FIG. 6 shows a diagram of guided surfing provided by a guided TV system, according to one embodiment of the present invention. Diagram 600, in FIG. 6, includes respective timelines for show "A", show "B", and show "C", and interface 610 allowing a viewer to select from display subset 606*a*, 606*b*, and 606*c*, which is periodically updated to reflect changes in the present viewing pattern of the viewer. Diagram 600 also includes advertising (ad) breaks, such as ad breaks 640*a*, 640*b*, and 640*c*, built into the respective timelines for show "A", show "B", and show "C." As shown by diagram 600, a viewer of the guided TV network can begin watching show "A" on an assigned channel. Show "A" can be selected based on the time of day or the viewing history corresponding to the remote device used by the viewer, for example. At different points in the timeline of each show, interface 610 can provide an on-screen display subset of a limited number of shows, such as three shows, for the viewer to select from before the show that the viewer is watching ends. Interface 610 can appear on a portion of the screen, such as the bottom or top of the screen.

Also shown in FIG. 6, before show "A" ends, the viewer can select show "B" from interface 610 and begin viewing show "B". While viewing show "B", the viewer can select show "C" from interface 610 and begin viewing show "C" or the viewer can select show "A" from interface 610 and begin viewing show "A" from the point at which the viewer had previously left show "A". In the guided surfing provided by the guided TV system, when the viewer switches from one show, e.g., show "A", to another show, e.g., show "B", a viewing progress point is placed in the show that the viewer has just left. The viewing progress point allows the viewer to return to the previously viewed show without missing any portion of that show. Thus, as shown in FIG. 6, guided surfing provided by an embodiment of the invention allows the viewer to go from show "A" to show "B" to show "C" and to go back from show "C" to show "B" to show "A". The guided surfing advantageously allows the viewer to return to a spot the viewer left in a previous show if the viewer desires.

Referring back to FIG. 5, the guided surfing experience represented by diagram 600, in FIG. 6, corresponds to recording a viewing progress point for each of a corresponding partially viewed item of TV content 532 delivered to remote system 520, and incorporating the viewing progress point in viewing history database 534. Guided selection application 536 may be configured to utilize the viewing progress point to suspend delivery of a first item of TV content 532 (e.g., show "A") to remote system 520 in favor of delivering a second item of TV content 532 (e.g., show "B") selected by remote system 520, and to subsequently resume delivery of show "A" at the viewing progress point in response to a later selection received from remote system 520.

The embodiment of FIG. 6 provides significant advantages when compared with conventional channel surfing. Conventional channel surfing causes the viewer to risk missing part of a show that the viewer is viewing by switching to another show. In contrast to conventional channel surfing, the guided surfing provided by the invention allows the viewer to switch from one show to another without the risk of missing a part of the previous show. As a result, the guided surfing allows the viewer to experiment with viewing unfamiliar shows without suffering the consequences inherent in conventional channel surfing.

As may be seen from FIG. 6, in one embodiment guided TV network interface 610 provides three shows for the viewer to select from, where each show can be customized and updated for the viewer based on the viewer's present viewing patterns. Thus, as shown in FIG. 6, at one point in time, interface 610 provides display subset 606*b* including shows "A", "C", and "E" for the viewer to select from, where display subset 606*b* has been updated for the viewer based on the present viewing pattern of the viewer.

Guided surfing provided by the present embodiment allows the network to entertain the viewer instead of the viewer having to sift through a content library. Guided surfing also increases viewer experimentation by lowering the barriers to trying and finding new content that may interest a viewer. Additionally, guided surfing can increase overall viewer satisfaction, thereby decreasing the likelihood that the viewer will watch a competitor's content by, for example, switching to a competitor's channel.

Also shown in FIG. 6, an embodiment of the guided TV system can include ad breaks 640*a*, 640*b*, and 640*c*, which can be set to occur at predetermined intervals in each show. At each ad break, the show that the viewer is watching can be stopped and the viewer can be presented with a limited number of ads, such as three ads, to select from, where each ad can be provided for the particular viewer. For example, each of the ads presented to the viewer can be based on the viewing habits of the viewer, such as the viewing history and/or the present viewing pattern. After the selected ad has been viewed, the viewer can be presented with three more ads to select from. These three ads can be determined, for example, based on the previous ad selected by the viewer.

Thus, in one embodiment of the invention, each subsequent group of ads can be further tailored to the interests of the viewer based on the previous ad selected by the viewer. In one embodiment, the viewer can watch a show without ads by paying a predetermined fee. For example, when the ad options are presented, the view may escape the ads and return to the show by agreeing to pay or be charged a certain fee. In one embodiment, instead of stopping the show at an ad break, to run advertising content, such as ad break 640*a* in show "A", an ad selected by the viewer can run while the show is running. For example, an ad can run in a picture-in-picture mode on a portion of the screen while the show is running. For example, an ad can run in a portion of the screen, such as the bottom or top portion of the screen, and overlap (or be superimposed on) the show that is running on the TV screen. Thus, the guided TV network provides different options for running ads with VOD movies or shows.

Figure 7:
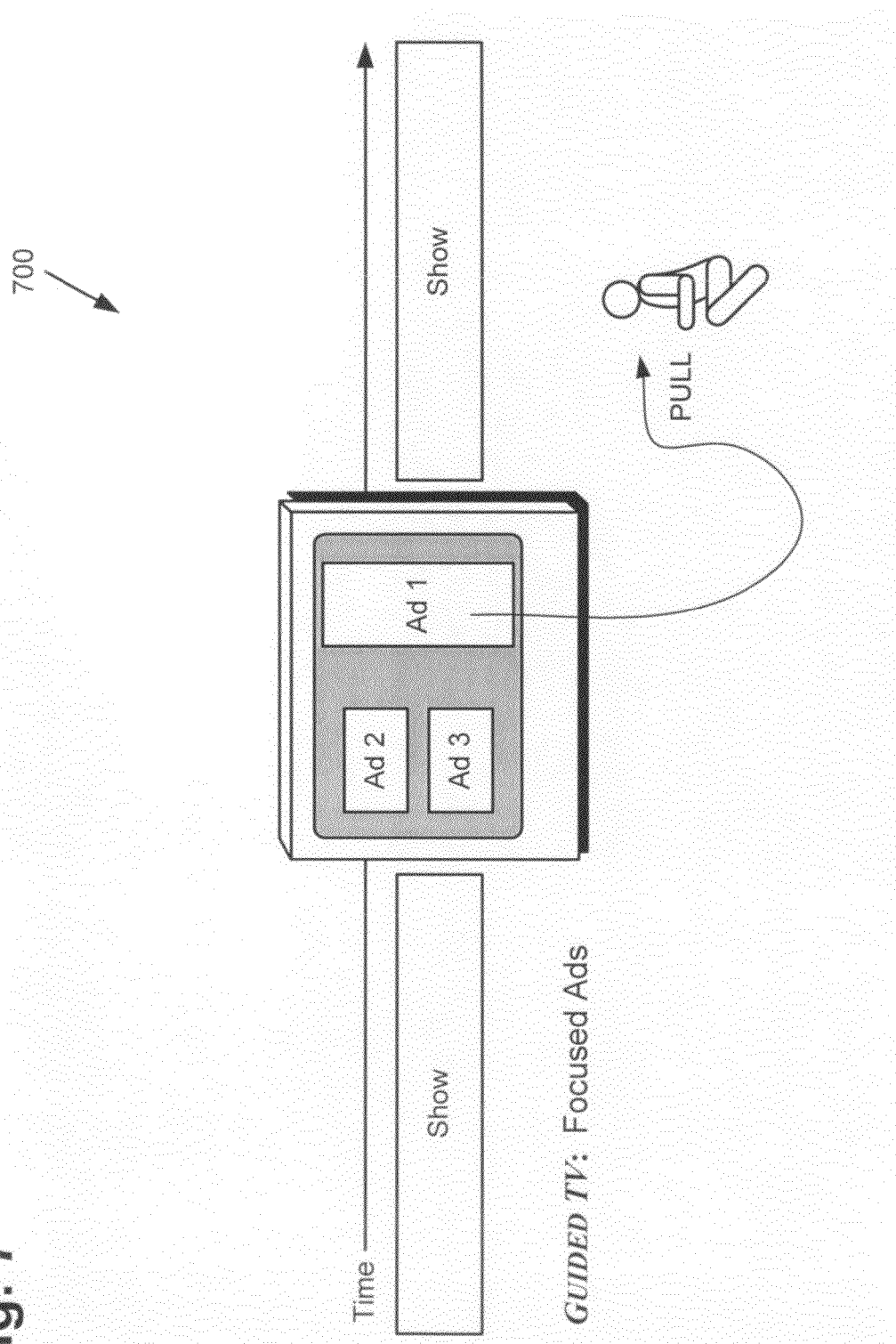
FIG. 7 shows a diagram of a guided TV advertising experience, according to one embodiment of the present invention.

By selecting ads via behavioral targeting of the viewer, an embodiment of the guided TV network can provide advertising spots that have increased value to an advertiser. The present guided TV network can also improve the relevance of advertising for a consumer or viewer based on viewing habits. FIG. 7 shows a diagram of a guided TV advertising experience, according to one embodiment of the present invention. As shown by diagram 700, the guided TV network can increase the relevance of advertising by providing a viewer with a choice of a limited number of ads to view so that the viewer might choose an ad that is interesting to the viewer. For example, a viewer can be presented with three ads to select from so that the viewer can choose the ad that is most relevant to the viewer's interests. Thus, by implementing a consumption paradigm utilizing the push/pull interaction dynamic to engage the viewer as an active participant in ad selection, the guided TV network approach increases the likelihood that the ad will have a lasting positive impression on the viewer.

Figure 8A:
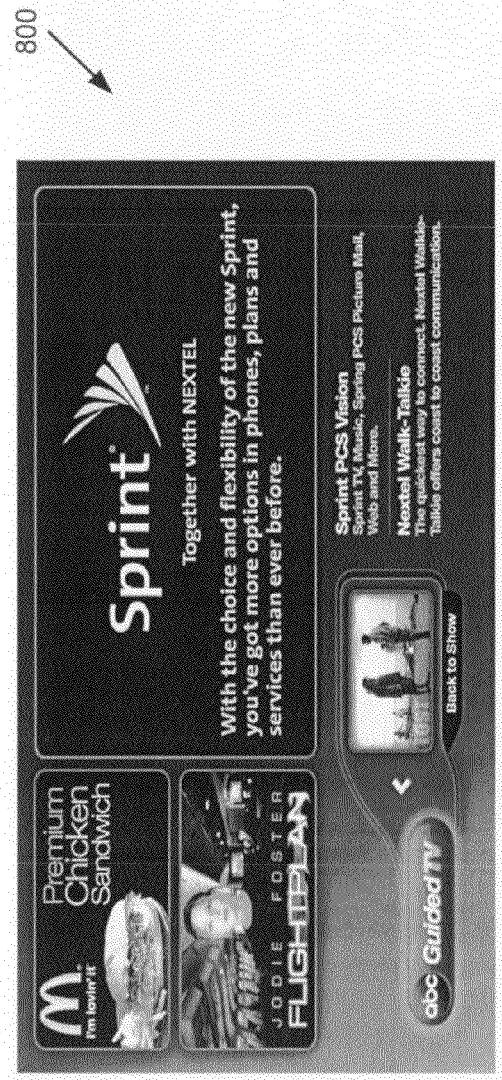
FIG. 8A shows a visual frame displayed during a guided TV advertising experience, according to one embodiment of the present invention.

FIG. 8A shows a diagram of a guided TV advertising experience, according to an embodiment of the present invention. In one embodiment of the guided TV network, a show that the viewer is watching will pause when it is time for a commercial break and the viewer will get a choice of three different ads to view. As shown by ad frame 800, in FIG. 8A, the viewer can select either a "McDonalds" ad, a "Flightplan" ad, or a "Sprint" ad to view. By providing the viewer with three choices, an embodiment of the invention empowers the viewer to choose the ad that is most relevant to the viewer's interests.

Figure 8B:
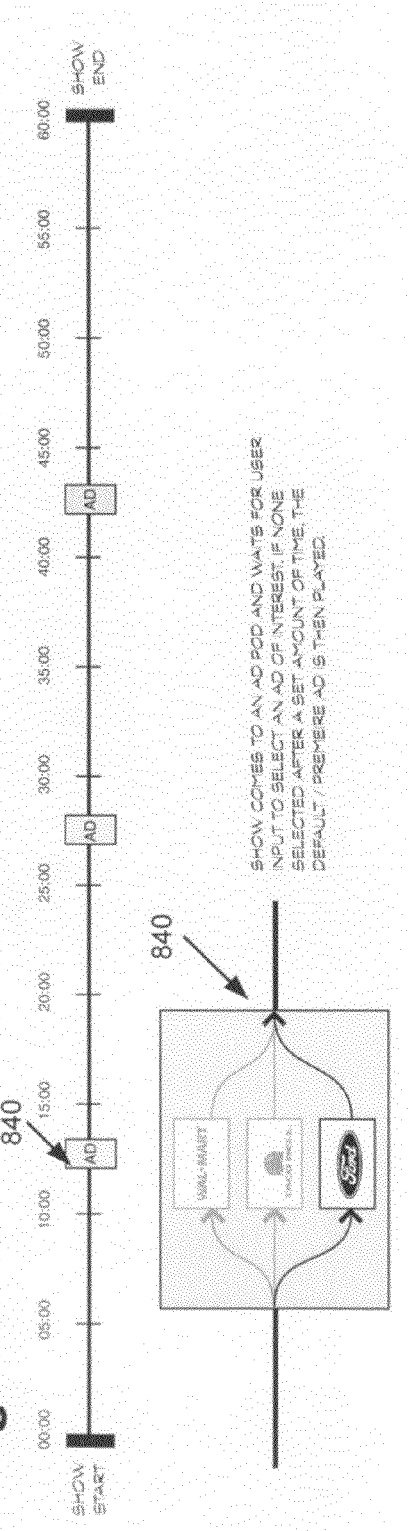
FIG. 8B shows a diagram of ad pods on a show timeline, according to one embodiment of the present invention.

FIG. 8B shows a diagram of ad pods on a show timeline, according to an embodiment of the present invention. As shown in FIG. 8B, ad pods such as ad pod 840, can be situated at selected times in a show timeline. When the show comes to an ad pod, the show is paused by the network and the viewer may select an ad to view from the ads presented in the ad pod. If none of the ads in the ad pod are selected by the viewer after a set amount of time has elapsed, a default/premiere ad can be shown. The guided TV network can provide an advertiser with the option of purchasing an entire ad pod, thereby providing the advertiser with the opportunity of offering a branded block of products to the viewer.

Figure 9:
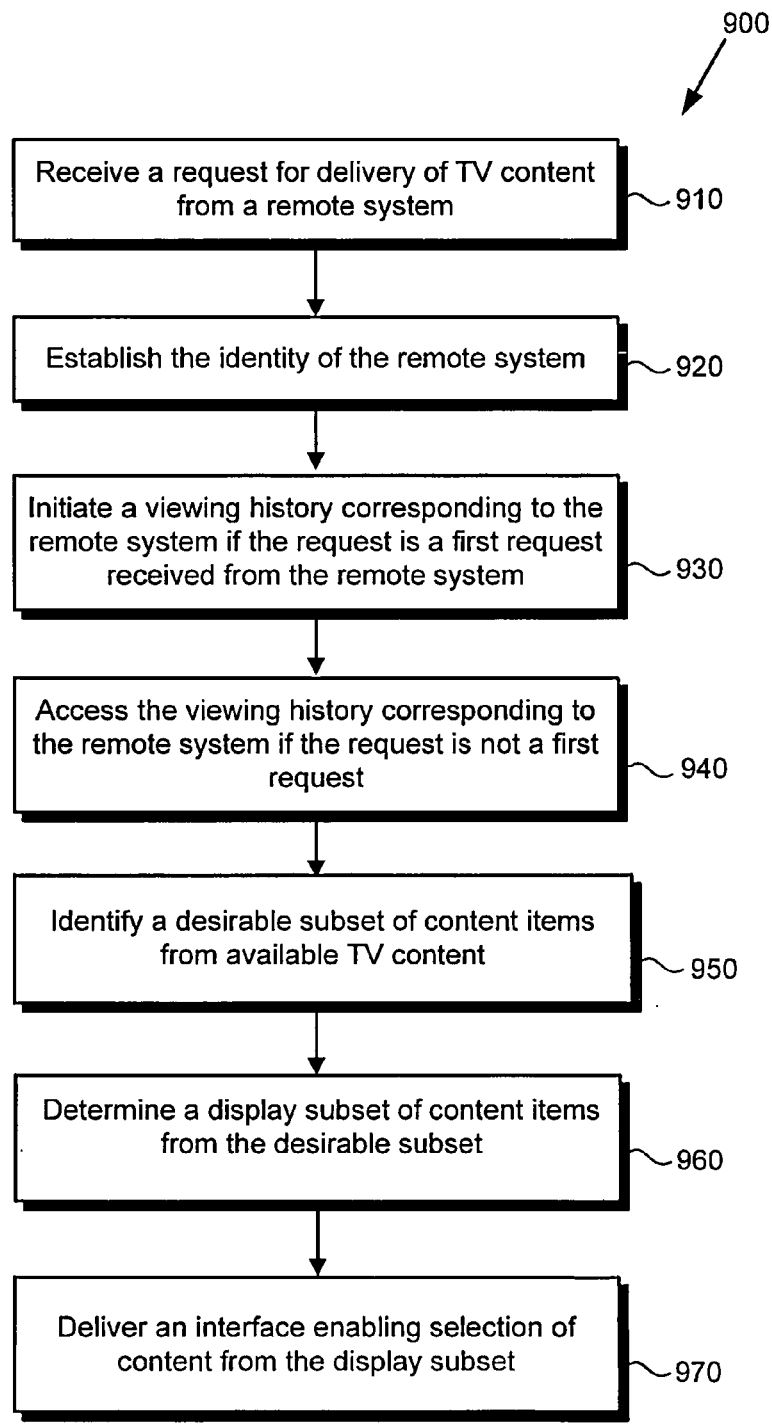
FIG. 9 is a flowchart presenting a method for guiding user selection of television content, according to one embodiment of the present invention.
Figure 10:
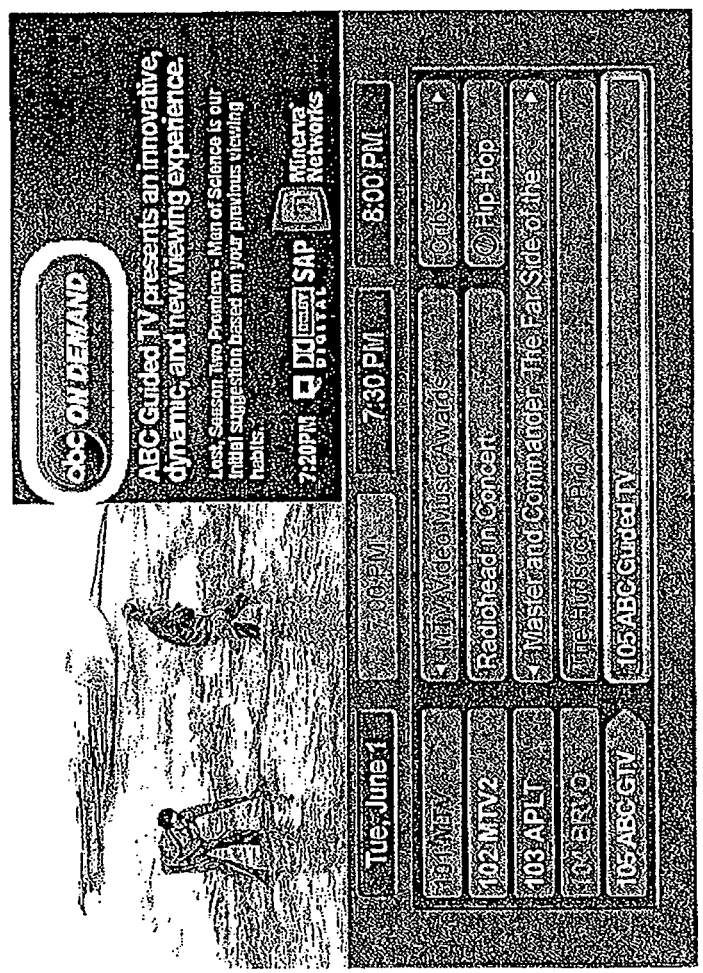
FIG. 10 shows a diagram of a program guide including an on-demand channel, according to an embodiment of the present invention.

The advantages provided by a guided TV network may also be described in terms of a method for guiding viewer selection of TV content. FIG. 9 is a flowchart presenting an example method for doing so. Certain details and features have been left out of flowchart 900 that are apparent to a person of ordinary skill in the art. For example, a step may consist of one or more substeps or may involve specialized equipment or materials, as known in the art. While steps 910 through 970, indicated in flowchart 900, are sufficient to describe the present embodiment, other embodiments may utilize steps different from those shown in flowchart 900, or may include more, or fewer steps.

Beginning with step 910 in FIG. 9, step 910 of flowchart 900 comprises receiving a request for delivery of TV content from a remote system. Referring to FIG. 5, step 910 may correspond to receipt at network server 530 of a request from remote system 520, for TV content 532, over network link 538.

The exemplary method of flowchart 900 continues with step 920, which comprises establishing an identity of remote system 520. Step 920 may be performed by any suitable identification or authentication mechanisms, as known in the art. Step 920 enables the archiving and retrieval of a viewing history corresponding to remote device 520, which may be performed in subsequent steps. For example, where the request received in step 910 is a first request from the remote device, i.e., no viewing history corresponding to the remote devise exists at the time of step 910, the remote system identity established in step 920 enables initiating a viewing history corresponding to remote devise 520, in step 930. Alternatively, where the request received in step 910 is not a first request from remote device 520, i.e., a viewing history corresponding to remote device 520 presently exists, that viewing history may be accessed in step 940 to assist in guiding viewer selection of available TV content.

Flowchart 900 continues with step 950, comprising identifying a desirable subset of content items from available TV content. Referring to the embodiment shown in FIG. 4, identifying a desirable subset in step 950 corresponds to identification of that subset of the entirety of content available on VOD library 402 likely to be desirable to a viewer utilizing remote device 420. Step 950 is represented in FIG. 4 by extraction of desirable subset 404 from VOD library 402. Identification of desirable subset 404 may be performed according to a first plurality of discrimination criteria including the viewing history. In some embodiments, the first plurality of discrimination criteria used to identify desirable subset 404 includes a human component, such as the programming expertise of a network executive. In other embodiments, the first plurality of discrimination criteria brought to bear in step 950 may be predetermined algorithmically, but result in a dynamic discrimination process due to the inclusion of the viewing histories which are likely to be unique to each respective corresponding remote system. It is noted that desirable subset 404 can comprise entertainment content, ad content, or a combination of entertainment and ad content, for example.

Step 960 of flowchart 900 comprises determining a display subset of content items from the desirable subset identified in step 950. The display subset is determined according to a second plurality of discrimination criteria including the viewing history, that may or may not coincide with the first plurality of discrimination criteria utilized to identify the desirable subset in earlier step 950. In one embodiment, for example, the display subset is periodically updated according to a present viewing pattern. Consequently, the present viewing pattern may constitute a discrimination criterion considered during determination of the display subset in step 960, but not considered during identification of the desirable subset in step 950. Referring once again to FIG. 4, display subset 406 comprises three content items for selection by remote system 420. Although the embodiment of FIG. 4 represents the display subset as including only three content items, in other embodiments, the display subset may include more or fewer content items for selection by remote system 420. Because display subset 406 is determined from desirable subset 404, display subset 406 may comprise any conceivable admixture of content types, such as entertainment content and/or ad content, comprised by desirable subset 404.

Moving on to step 970 of flowchart 900 and continuing to refer to FIG. 4, step 970 comprises delivering interface 410 enabling a viewer of remote system 420 to select content items from display subset 406, thereby guiding the viewer's selection of the available TV content. In some embodiments, a method for guiding viewer selection of TV content further includes enabling guided surfing, as described in conjunction with FIG. 6. In addition, in some embodiments, the method may include pre-selection of a presentation content item for automatic presentation to the viewer concurrently with delivery of interface 410 enabling selection from display subset 406. In that latter embodiment, pre-selection of the presentation content items may be performed according to yet a third plurality of discrimination criteria including the viewing history.

In some embodiments, the third plurality of discrimination criteria utilized for pre-selection may substantially coincide with the first plurality of discrimination criteria utilized to identify the desirable subset in step 950. In other embodiments, the third plurality of discrimination criteria used for pre-selection may substantially coincide with the second plurality of discrimination criteria used to determine the display subset in step 960. In yet other embodiments, the third plurality discrimination criteria may differ from both the first and second pluralities of discrimination criteria relied upon in steps 950 and 960, respectively.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

Figure 11:
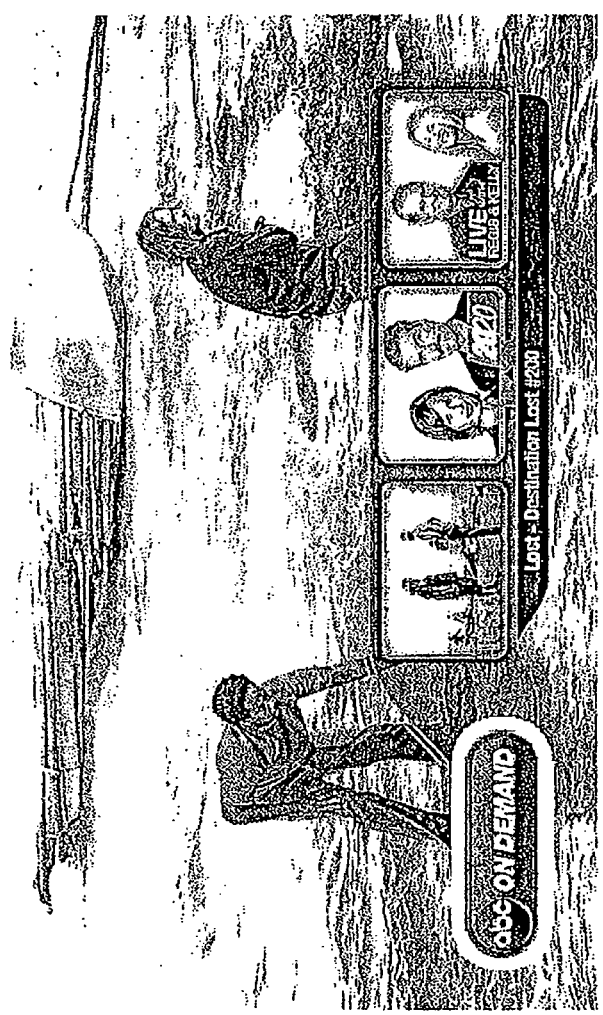
FIG. 11 shows a TV screen including a guided TV system interface, according to an embodiment of the present invention.

FIG. 11 shows a TV screen including a guided TV system interface, according to an embodiment of the present invention. When a viewer switches to an ABC on-demand channel in the guided TV system, the viewer is presented with an ABC show that can be chosen, for example, based on network priorities. The viewer can be immediately given a choice of a limited number of other shows, e.g., three other shows from ABC, to watch if the viewer prefers a different program.

What is claimed is:

1. A method for guiding a viewer for selecting television contents, the method comprising:
    receiving a request for delivery of television contents from a remote system generated by a selection of a television channel corresponding to a single television broadcast network;
    establishing an identity of the remote system;
    accessing a viewing history of the television contents of the single television broadcast network corresponding to the remote system in response to receiving the request;
    identifying a desirable subset of content items from available television contents of the single television broadcast network based upon a first plurality of discrimination criteria including the viewing history;
    determining a display subset of content items from the desirable subset, to be provided for selection by the remote system, according to a second plurality of discrimination criteria including the viewing history, wherein the display subset of content items includes at a first content item, a second content item and a third content item;
    delivering, in response to the request generated by the selection of the television channel, an interface to the remote system for enabling the viewer of the remote system to select one of the content items from the display subset, wherein each of the content items is a single show, and wherein the interface separately and contemporaneously includes each single show corresponding to each of the content items of the display subset for selection by the viewer;
    receiving a first selection of the first content item by the viewer from the interface;
    while playing a first show corresponding to the first content item in response to the first selection, displaying the interface, and receiving a second selection of the second content item by the viewer from the interface;
    in response to the receiving of the second selection, stopping the playing of the first show at a first progress point in the first show, and starting to play a second show corresponding to the second content item;
    during the playing of the second show, displaying the interface, and receiving a third selection of the first content item by the viewer from the interface; and
    in response to the receiving of the third selection, stopping the playing of the second show, and resuming the playing of the first show from the first progress point in the first show.

2. The method of claim 1 further comprising:
    updating the display subset according to a present viewing pattern.

3. The method of claim 1, wherein the desirable subset comprises entertainment content.

4. The method of claim 1 further comprising:
    pre-selecting a presentation content item from available television content for delivery to the remote system, the pre-selecting performed according to a third plurality of discrimination criteria including the viewing history and one or more factors independent of the viewing history; and
    delivering the presentation content item to the remote system for automatic presentation to the viewer.

5. The method of claim 4, wherein the presentation content item and the interface enabling the viewer of the remote system to select content items from the display subset are delivered concurrently.

6. The method of claim 4, wherein the presentation content item comprises entertainment content.

7. The method of claim 6 further comprising:
    initiating the viewing history corresponding to the remote system if the request is a first request for delivery of television content from the remote system.

8. The method of claim 7, wherein the display subset includes one of entertainment content and advertising content.

9. The method of claim 4, wherein the one or more factors comprise regional consumption preferences.

10. A communication network enabling guided selection of television contents, the communication network comprising:
    a network server accessible to a remote system over a network communication link;
    a plurality of television contents located on the network server;
    a guided selection application accessible through the communication network, the guided selection application configured to interact with the remote system by:
        receiving a request for delivery of television contents from a remote system generated by a selection of a television channel corresponding to a single television broadcast network;
        establishing an identity of the remote system;
        accessing a viewing history of the television contents of the single television broadcast network corresponding to the remote system in response to receiving the request;
        identifying a desirable subset of content items from the plurality of television contents of the single television broadcast network based upon a first plurality of discrimination criteria including the viewing history;
        determining a display subset of content items from the desirable subset, to be provided for selection by the remote system, according to a second plurality of discrimination criteria including the viewing history, wherein the display subset of content items includes at a first content item, a second content item and a third content item;

delivering, in response to the request generated by the selection of the television channel, an interface to the remote system for enabling a viewer of the remote system to select one of the content items from the display subset, wherein each of the content items is a single show, and wherein the interface separately and contemporaneously includes each single show corresponding to each of the content items of the display subset for selection by the viewer;

receiving a first selection of the first content item by the viewer from the interface;

while playing a first show corresponding to the first content item in response to the first selection, displaying the interface, and receiving a second selection of the second content item by the viewer from the interface;

in response to the receiving of the second selection, stopping the playing of the first show at a first progress point in the first show, and starting to play a second show corresponding to the second content item;

during the playing of the second show, displaying the interface, and receiving a third selection of the first content item by the viewer from the interface; and in response to the receiving of the third selection, stopping the playing of the second show, and resuming the playing of the first show from the first progress point in the first show.

11. The communication network of claim 10, wherein the guided selection application is further configured to update the display subset according to a present viewing pattern.

12. The communication network of claim 10, further comprising the remote system, wherein the remote system is one of a cable television tuner, a satellite set-top box, a mobile telephone, a digital media player, personal digital assistant (PDA), a wired or wireless computer, and a gaming console.

13. The communication network of claim 10, wherein the guided selection application is further configured to:

pre-select a presentation content item from among the television content for presentation to the viewer by the remote system, the pre-selecting performed according to a third plurality of discrimination criteria including the viewing history and one or more factors independent of the viewing history; and deliver the presentation content item to the remote system for automatic presentation to the viewer.

* * * * *